United States Patent
Kuroha

[15] 3,683,704
[45] Aug. 15, 1972

[54] COARSE AND FINE ADJUSTMENT DEVICE OF THE TYPE USING THREE CONCENTRIC SHAFTS

[72] Inventor: Noboru Kuroha, Tokyo, Japan
[73] Assignee: Nippon Kogaku K.K., Tokyo, Japan
[22] Filed: Aug. 21, 1970
[21] Appl. No.: 65,792

[30] Foreign Application Priority Data

Aug. 26, 1969   Japan .....................44/67077

[52] U.S. Cl. ..................74/10.52, 74/89.17, 74/796, 350/86
[51] Int. Cl...............................................F16h 35/18
[58] Field of Search .......350/86; 74/10.52, 89, 89.17

[56] References Cited

UNITED STATES PATENTS 2,877,651   3/1959   Erbe et al. ....................350/86

Primary Examiner—David Schonberg
Assistant Examiner—Robert L. Sherman
Attorney—Harry G. Shapiro

[57] ABSTRACT

A coarse and fine adjustment device employs an assembly of three concentric shafts—a fine adjustment shaft, a drive shaft for moving an object supporting table, and a coarse adjustment shaft. A predetermined number of planetary balls are held by retaining surfaces provided by the respective shafts. The fine adjustment shaft is formed with an annular V-shaped groove. The balls are retained in the groove in engagement with the inclined surfaces thereof by inclined surfaces respectively provided on opposite sides of the balls by the drive and coarse adjustment shafts. The angle of engagement of the retaining surface provided by the drive shaft differs from the angle of engagement of the retaining surface of the coarse adjustment shaft.

6 Claims, 4 Drawing Figures

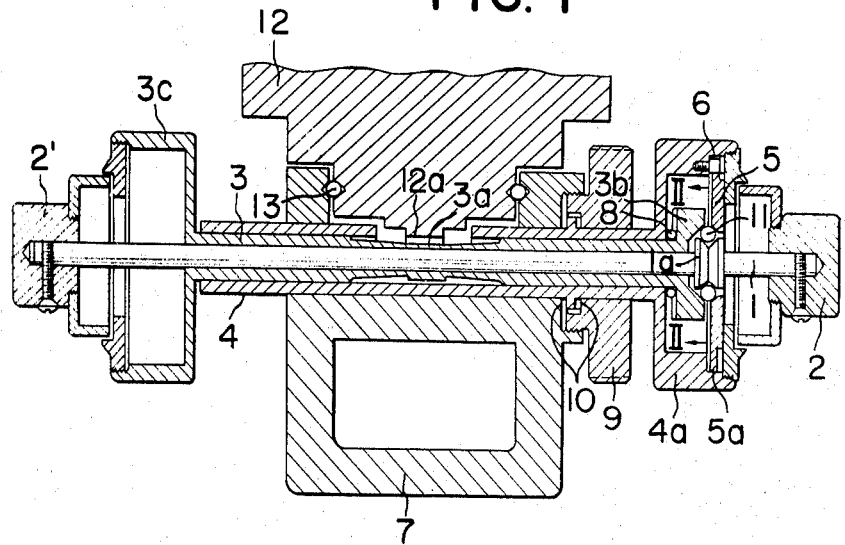
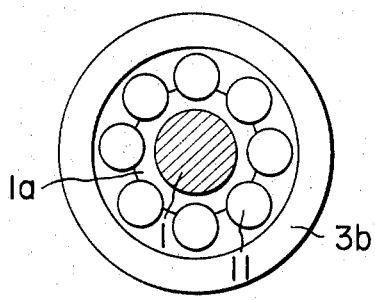
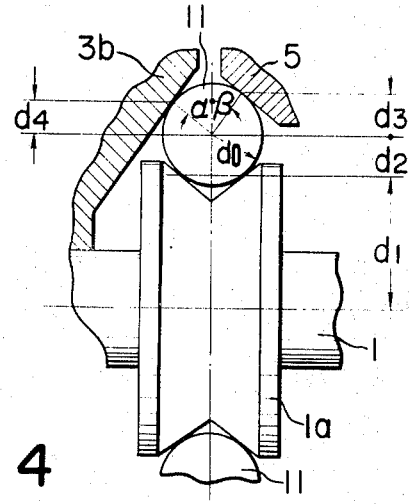
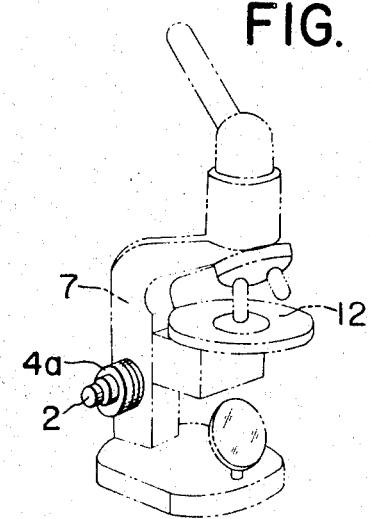

COARSE AND FINE ADJUSTMENT DEVICE OF THE TYPE USING THREE CONCENTRIC SHAFTS

BACKGROUND OF THE INVENTION

1. Field of the Invention

This invention generally relates to an adjustment device, and more particularly to a coarse and fine adjustment device of the type which uses three concentric shafts.

2. Description of the Prior Art

Various types of coarse and fine adjustment device have heretofore been proposed to vertically move the object supporting table of an optical instrument. However, in these known adjustment devices, some of which employ steel balls, there is slack in the mechanism. Also, the mechanism is relatively complicated.

SUMMARY OF THE INVENTION

It is the main object of the present invention to overcome the above-mentioned limitations of the prior art devices and to provide a device which can accomplish accurate coarse and fine adjustments with a simple mechanism with ease.

Through the device of the present invention employs steel balls, it is entirely different in basic principle from known types of adjustment devices. The coarse and fine adjustment device of the invention comprises a fine adjustment shaft, a drive shaft for moving an object supporting table, a coarse adjustment shaft to which is imparted a predetermined degree of friction, and a predetermined number of planetary balls. The three shafts are concentrically arranged with one another and have respective retaining surfaces which engage and retain the planetary balls. The angle of engagement or contact $\alpha$ between the planetary balls and the drive shaft and the angle of engagement or contact $\beta$ between the planetary balls and the coarse adjustment shaft are designed to satisfy the relation that $\alpha > \beta$ or $\alpha < \beta$.

The above and other objects and features of the present invention will become fully apparent when the following description is read in connection with the accompanying drawings.

BRIEF DESCRIPTION OF THE DRAWINGS

FIG. 1 is a horizontal cross-sectional view of the coarse and fine adjustment device according to an embodiment of the present invention.

FIG. 2 is a sectional view taken along line II—II of FIG. 1.

FIG. 3 is a diagrammatic view illustrating the principle of the present invention.

FIG. 4 is a perspective view schematically showing an example of application of the device of the present invention.

DESCRIPTION OF THE PREFERRED EMBODIMENT

The invention will now be described with respect to an example thereof as applied to the focusing device for a microscope.

Referring to FIG. 1, 2 and 4, a fine adjustment shaft 1 has knobs 2 and 2' fixedly mounted at the opposite ends thereof, as by screws. An annular V-shaped groove 1a is formed circumferentially of the fine adjustment shaft 1 at one end portion thereof adjacent to the knob 2. A drive shaft 3 extends concentrically and externally of the fine adjustment shaft 1 and has a pinion 3a formed centrally thereof for engagement with a rack 12a formed in an object supporting table 12 to be described. A retainer portion 3b for engagement with planetary balls 11 is formed on the drive shaft 3 at one end thereof which is adjacent to the V-shaped groove 1a and a knob member 3c formed with a predetermined number of divisions or indicia on the end face thereof is integrally provided on the drive shaft 3 at the other end thereof.

A coarse adjustment shaft 4 extends in concentric relationship with the drive shaft 3 and has a coarse adjustment knob 4a formed at one end thereof which is adjacent to the retainer portion 3b of the drive shaft 3. A retainer plate 5 engaging the planetary balls 11 is secured to the coarse adjustment knob 4a, by means of a screw 6. As shown, the fine adjustment shaft 1, drive shaft 3 and coarse adjustment shaft 4 are rotatably mounted to the body portion 7 of the device and connected together for relative rotation with respect to one another. The drive shaft 3 may be driven for light rotation by means of ball bearing 8. The coarse adjustment shaft 4 is arranged so that a predetermined degree of friction may be imparted thereto from an adjustment ring 9 through a friction member 10, the ring 9 being screwed to the device body portion 7. As best seen in FIGS. 1 and 2, the planetary balls 11 whose number is predetermined are disposed on the annular V-shaped groove 1a circumferentially thereof in such a manner that these balls are retained by the retainer portion 3b and retainer plate 5. As shown in FIG. 3, each of the balls is in engagement with the inclined surfaces of the groove. The drive shaft retainer 3b on one side of the V-shaped groove provides a third inclined surface in engagement with each of the balls. The coarse adjustment shaft retainer means or plate 5 on the opposite side of the groove provides a fourth inclined surface in engagement with each of the balls. A spring washer 5a is provided to prevent the slip of the planetary balls 11.

It is seen in FIG. 3 that the planetary balls 11, retainer portion 3b and retainer plate 5 are arranged so that the angle of contact $\alpha$ between each ball 11 and retainer portion 3b and the angle of contact $\beta$ between each ball 11 and retainer plate 5 satisfy the relation that $\alpha > \beta$. The angle of rotation $\theta$ of the fine adjustment shaft 1 and the amount of fine adjustment $h$ provided thereby are in the following relation:

$$h = D \times \frac{d_0 d_1 (\cos \alpha - \cos \beta)}{(d_1 + d_2 + d_3)(d_2 + d_3)}$$

where D represents the pitch radius of the pinion 3a formed on the drive shaft 3, $d0$ the radius of the planetary ball 11, $d1$ the distance from the center of the fine adjustment shaft 1 to the point of contact between the planetary ball 11 and the fine adjustment shaft 1, $d2$ the distance from the center of the planetary ball 11 to the point of contact between the planetary ball 11 and the fine adjustment shaft 1, $d3 = d0 \cos \beta$ the distance from the center of the planetary ball 11 to the point of contact between the planetary ball 11 and the retainer plate 5, and $d4 = d0 \cos \alpha$ the distance from the center of the planetary ball 11 to the point of contact between the planetary ball 11 and the drive shaft 3.

From the foregoing equation, it will be seen that when the fine adjustment shaft 1 is rotated an angle $\theta$, the object supporting table 12 to be described is displaced an amount $h$. The object supporting table 12 is mounted for vertical sliding movement on the device body portion 7 by means of ball bearings 13, and the table is formed with a rack 12a engaging the pinion 3a of the drive shaft 3.

To provide a fine adjustment of the object supporting table 12, the fine adjustment knob 2 is first rotated. This causes the fine adjustment shaft 1 fixed to the knob 2 to rotate and accordingly the planetary ball 11 to rotate and revolve. At this stage the coarse adjustment shaft 4 and retainer plate 5 are prevented from rotating by a predetermined friction imparted thereto by the friction member 10 so that the drive shaft 3 may be rotated in the same direction as the fine adjustment shaft 1 by a differential amount corresponding to the difference between the aforesaid angles $\alpha$ and $\beta$. As a result, the object supporting table 12 is vertically moved by an amount equal to that differential amount through the engagement between the pinion 3a and rack 12a. Moreover, the rate of fine adjustment of the object supporting table 12 may be suitably selected by suitably selecting the angles of contact $\alpha$ and $\beta$ within the range of $\alpha > \beta$.

To attain a coarse adjustment of the object supporting table 12, the coarse adjustment knob 4a is first rotated. Upon rotation of this knob 4a, the retainer plate 5, planetary balls 11, drive shaft 3 and fine adjustment shaft 1 are a all rotated to vertically move the object supporting table 12 by an amount equal to the amount of rotation of the coarse adjustment shaft 4 through the engagement between the rack 12a and pinion 3a. The coarse adjustment of the object supporting table 12 may also be accomplished by rotating the knob 3c for the drive shaft 3.

The angles of contact $\alpha$ and $\beta$ may alternatively be in the relation that $\alpha < \beta$. In this case, it will be appreciated that rotation of the fine and coarse adjustment knobs 2 and 4a in the same direction causes the fine and coarse adjustments of the object supporting table 12 to take place in the opposite direction to that in the case of $\alpha > \beta$.

The device of the present invention eliminates mechanical slack and provides coarse and fine adjustment with a high degree of accuracy. The mechanism is simple, economical to manufacture and highly practical in use.

What is claimed is:

1. A device for coarse and fine adjustment of a movable table comprising a rotatable fine adjustment shaft having an annular V-shaped groove, a plurality of planetary balls disposed in the groove each in engagement with the inclined surfaces of the groove, a rotatable drive shaft concentric with the fine adjustment shaft having means for cooperation with means associated with the table to move the table, the drive shaft having retainer means on one side of the V-shaped groove providing a third inclined surface in engagement with each of the planetary balls, and a rotatable coarse adjustment shaft concentric with the drive shaft having retainer means on the opposite side of the V-shaped groove providing a fourth inclined surface in engagement with each of the planetary balls, the angle of engagement of the fourth surface with the balls being different than the angle of engagement of the third surface.

2. A device for coarse and fine adjustment of a table according to claim 1 including adjustable friction means cooperable with the coarse adjustment shaft.

3. A device for coarse and fine adjustment of a table according to claim 1 wherein the angle of engagement of the third surface with each of the planetary balls is greater than the angle of engagement of the fourth surface.

4. A device for coarse and fine adjustment of a table according to claim 1 wherein at least one of the drive shaft retainer means and the coarse adjustment shaft retainer means is displaceable in the direction of the axes of the shafts.

5. A device for coarse and fine adjustment of a table according to claim 1 wherein the drive shaft is provided with a knob member at the end thereof opposite the end having the retainer means, the knob member having indicia thereon.

6. A device for coarse and fine adjustment of a table according to claim 2 wherein the angle of engagement of the third surface with each of the planetary balls is greater than the angle of engagement of the fourth surface; wherein at least one of the drive shaft retainer means and the coarse adjustment shaft retainer means is displaceable in the direction of the axes of the shafts; and wherein the drive shaft is provided with a knob member at the end thereof opposite the end having the retainer means, the knob member having indicia thereon.

* * * * *